United States Patent

[11] 3,576,233

| [72] | Inventor | Chester J. Thatcher |
| | | 225 W. Hanover St., Holstein, Iowa 51025 |
| [21] | Appl. No. | 847,895 |
| [22] | Filed | Aug. 6, 1969 |
| [45] | Patented | Apr. 27, 1971 |

[54] SCAFFOLD STRUCTURE
4 Claims, 14 Drawing Figs.
[52] U.S. Cl. .................................................... 182/63,
182/144, 182/145
[51] Int. Cl. ..................................................... E04g 1/18
[50] Field of Search ............................................ 182/63,
145, 146, 142, 143, 148, 17, 144

[56] References Cited
UNITED STATES PATENTS
| 2,420,903 | 5/1947 | Noble ........................... | 182/145 |
| 2,569,653 | 10/1951 | Boedecker .................. | 182/145 |
| 2,698,673 | 1/1955 | Solomon ...................... | 182/63 |
| 2,857,212 | 10/1958 | Everitt ........................... | 182/147 |
| 2,998,094 | 8/1961 | Fisher ........................... | 182/148 |

Primary Examiner—Reinaldo P. Machado
Attorney—Rudolph L. Lowell

ABSTRACT: A scaffold structure includes a frame having a pair of upright tubular track members arranged along one side of a vehicle in a longitudinally spaced relation. Each track member adjustably carries a vertically movable carriage member. Horizontal arms on the carriage members extend laterally outwardly from the one side of the vehicle and support a horizontal work platform. The tracks are adjustably mounted on the vehicle for movement transversely thereof to provide for a lateral adjustment of the platform relative to the vehicle. The carriage members are vertically movable by a motor and winch assembly supported from the underside of the platform and interconnected by cables with the carriage members. Power to the motor is supplied from the vehicle battery.

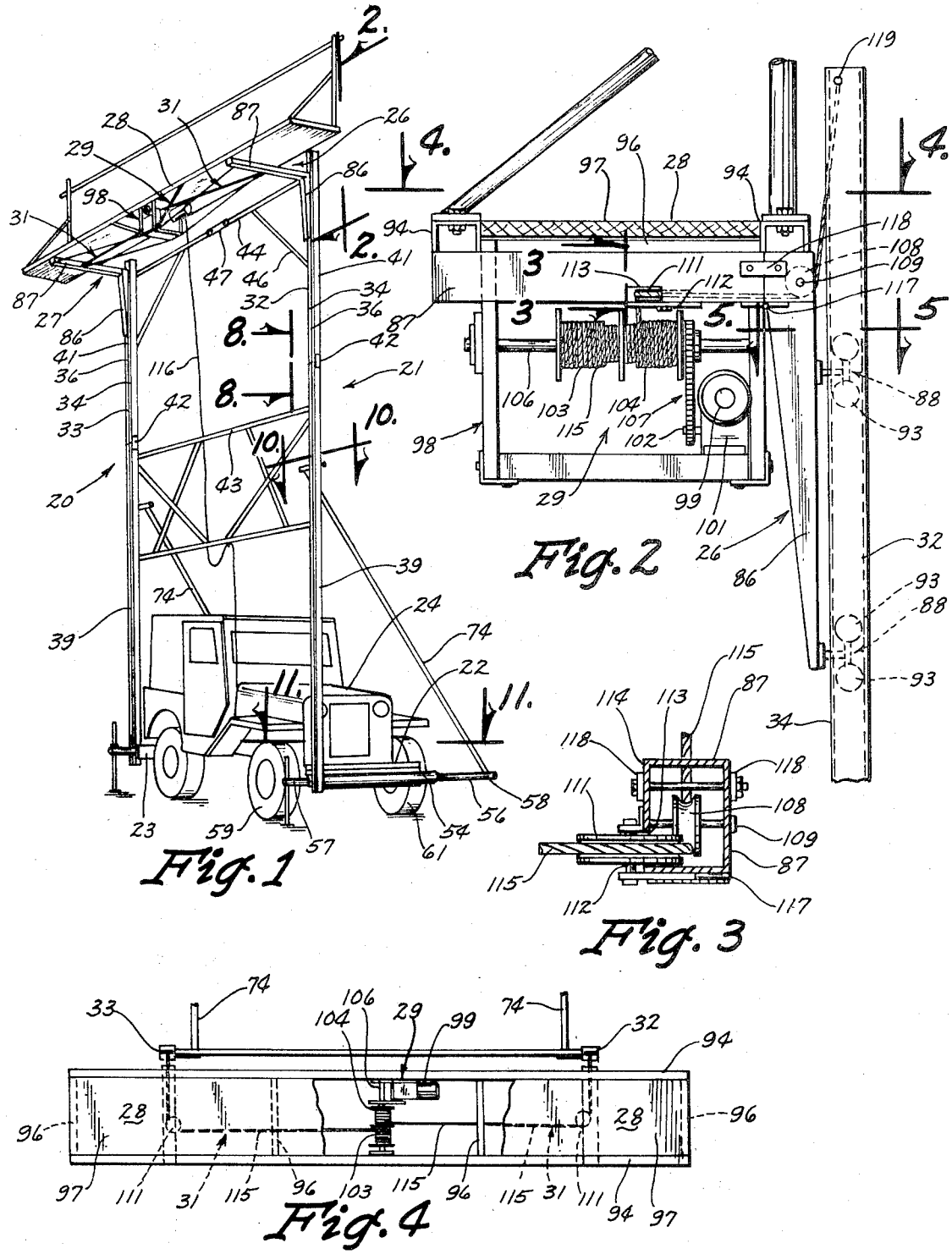

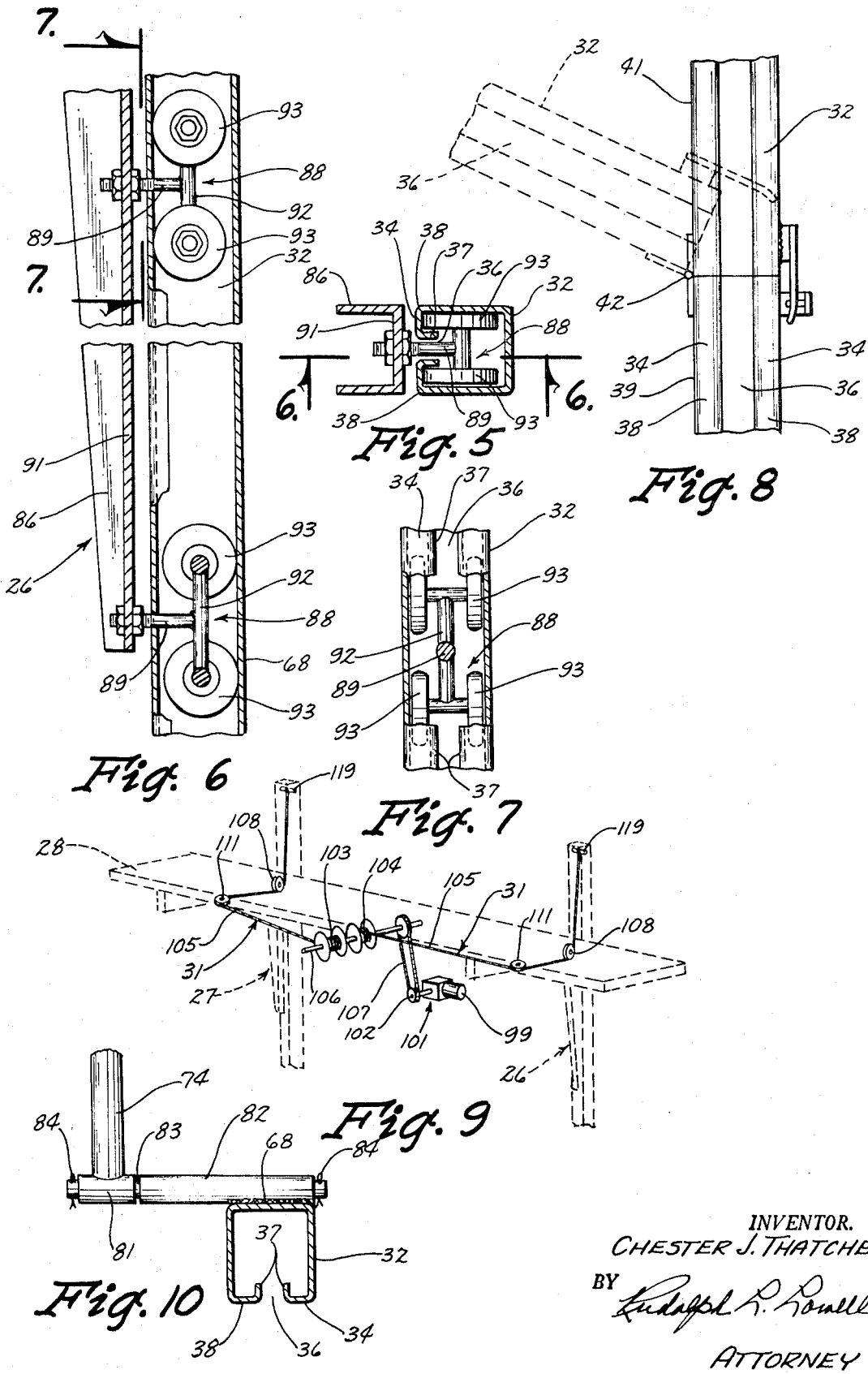

SCAFFOLD STRUCTURE

SUMMARY OF THE INVENTION

The invention provides a lightweight rigid scaffold structure capable of being readily assembled on a road vehicle, such as a Jeep, for lateral adjustment relative to one side of the vehicle. A horizontal work platform is mounted on carriage members that are vertically movable on corresponding upright tubular track members over the full length thereof. By virtue of the lateral adjustment of the scaffold, the platform can be positioned adjacent the wall of a building for travel therealong regardless of vehicle obstructions adjacent the wall such as plants, window wells and the like. With the motor and winch assembly mounted from the underside of the platform no special supporting structure therefor is required on the vehicle. The motor is driven from the vehicle battery and the winch is interconnected with the carriage members by cables that extend within the track members and below the platform so as to be effectively concealed. Exposed cables and wires with which a workman may become entangled are thus substantially eliminated. The scaffold may be foldable for transport on the vehicle, and is quickly removable from the vehicle to provide for a normal use of the vehicle free of any encumbering parts of the scaffold structure.

BRIEF DESCRIPTION OF THE DRAWINGS

FIG. 1 is a front perspective view of a road vehicle showing the scaffold structure in assembly relation therewith;

FIG. 2 is an enlarged end view of a work platform that forms part of the scaffold structure looking in the direction of line 2-2 in FIG. 1;

FIG. 3 is an enlarged sectional detail view taken along line 3-3 in FIG. 2;

FIG. 4 is a reduced top plan view of the work platform, with parts broken away, as seen on line 4-4 in FIG. 2;

FIG. 5 is an enlarged sectional detail view taken on line 5-5 in FIG. 2;

FIG. 6 is a sectional detail view as seen along line 6-6 in FIG. 5 showing the assembly of a vertically movable platform supporting carriage with an upright track member;

FIG. 7 is a sectional view on the line 7-7 in FIG. 6 showing a roller unit for a platform supporting carriage;

FIG. 8 is a detail view of a hinge structure for a track member;

FIG. 9 is a diagrammatic perspective view of the power transmission system for vertically moving the work platform;

FIG. 10 is an enlarged sectional view taken on line 10-10 in FIG. 1 showing the connection of a track member with a bracing member therefor;

DETAILED DESCRIPTION OF A PREFERRED EMBODIMENT

Figure 11:
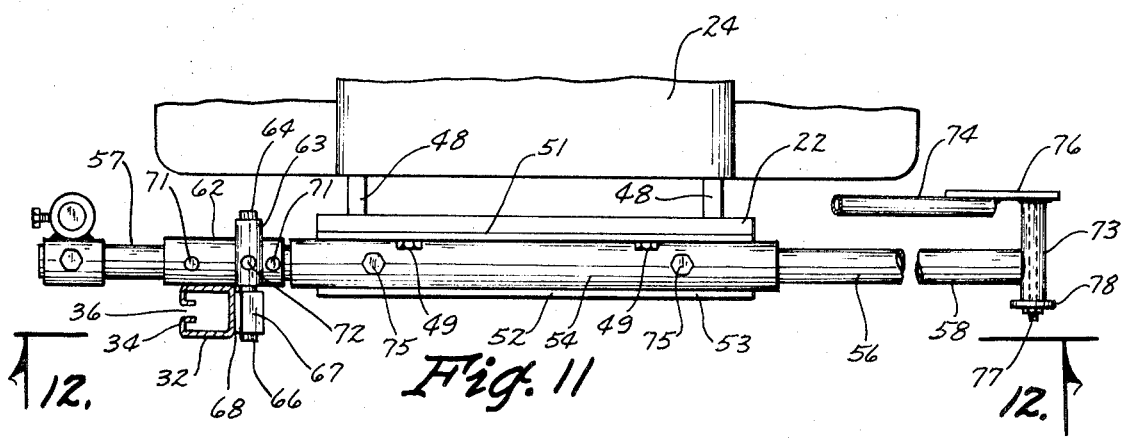
FIG. 11 is an enlarged plan view of the front end portion of a vehicle, as seen on line 11-11 in FIG. 1 showing the front bumper mounting of the scaffold structure.

The scaffold structure of this invention, indicated generally at 20 in FIG. 1, comprises an upright frame 21 that is adjustably mounted on the front and rear bumper units 22 and 23, respectively, of a vehicle, such as a Jeep 24, for movement laterally of the vehicle relative to one side thereof, illustrated in the drawings as the right side. A pair of vertically movable front and rear carriage members 26 and 27, respectively, supported on and spaced longitudinally of the frame 21 carry a horizontal work platform 28. A motor and winch assembly 29, mounted from the underside of the platform 28 is interconnected with the carriage members 26 and 27 by corresponding cable and pulley assemblies, each of which is indicated generally as 31.

The scaffold frame 21 includes front and rear upright tubular track members 32 and 33, respectively, corresponding to the carriage members 26 and 27, also respectively. As shown in FIGS. 5 and 8, each track member 32 and 33 is formed over the full length of its outer side 34 with a longitudinally extended center slot 36 that is defined by inwardly turned or bent sidewall portions 37 so as to form a pair of channel shape tracks 38 to each side of the slot 36. The outer sides 34 of the track members 32 and 33 lie in a common vertical plane so that the slots 36 face in a direction away from the vehicle 24, as illustrated in FIG. 1.

Each track member 32 and 33 has a lower section 39 and an upper section 41 that are hinged together at 42 (FIGS. 1 and 8) for foldable movement of the upper sections 41 longitudinally of the frame 21 and inwardly toward each other to horizontally extended side by side positions. The lower track sections 39 (FIG. 1) are interconnected by a truss assembly 43 at a position adjacent the hinge connections 42. The upper sections 41 have their top ends interconnected by a longitudinal connector member 44 that is supported by a brace member 46 with a corresponding track member 32 and 33.

The connector member 44 is comprised of two sections that are suitably connected together at their inner ends, as indicated at 47, and bolt connected at their outer ends to a corresponding track member. In turn each brace member 46 has the opposite ends thereof bolt connected to the connector member 44 and an adjacent track member 32 and 33. On disconnection of the two sections of the connector 44 from each other and removal of the bolt connection of a brace member 46 with a corresponding connector section, each connector section and associated brace member 46 is foldable in a side by side relation longitudinally of a corresponding upper track section 41. The upper track sections 41 are then folded toward each other to horizontally extended side by side positions. In this respect it is to be noted that the hinge connection 42 for the front track member 32 is located vertically above the hinge connection 42 for the rear track member 43.

The lower ends of the track members 32 and 33 are similarly mounted on corresponding ones of the vehicle bumpers 22 and 23 to only the front bumper mounting will be described in detail, with like numbers being applied to like parts of the rear bumper mounting.

Figure 12:
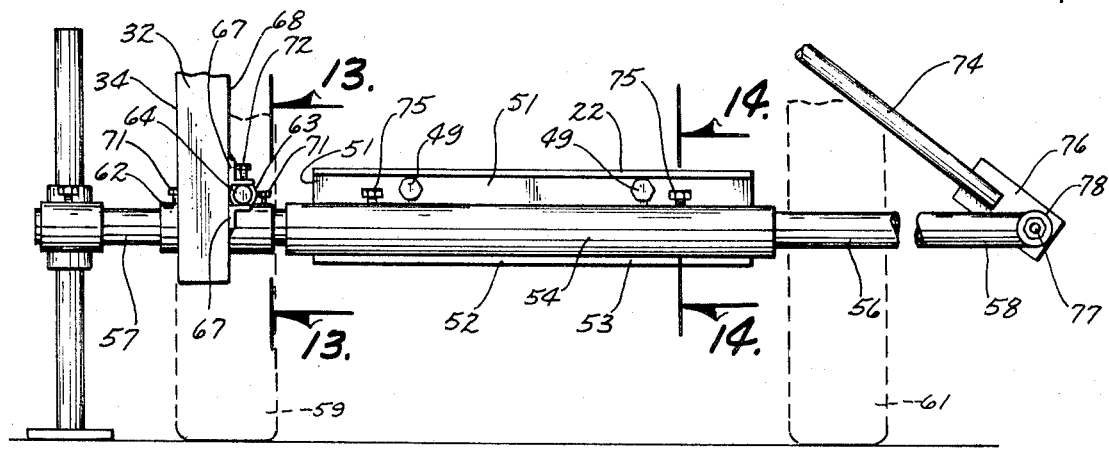
FIG. 12 is a front view of the bumper mounting as viewed on line 12-12 in FIG. 11.
Figures 13, 14:
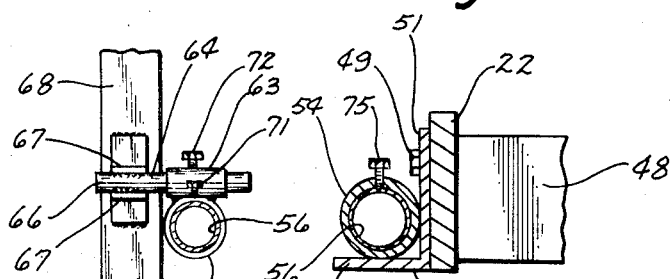
FIGS. 13 and 14 are sectional detail views on lines 13-13 and 14-14, respectively, in FIG. 12.

Referring to FIGS. 11, 12 and 14, the front bumper 22 is carried on bumper braces 48 that are secured in a conventional manner to the main frame of the vehicle 24. Attached to the front or outer side of the front bumper 22, as by bolts 49, is an upright leg 51 of an angle member 52, the other leg 53 of which projects horizontally outwardly from the lower end of the upright leg 51. The angle member 52 extends transversely of the vehicle 24 over the full length of the front bumper 22. Welded to the legs 51 and 53 of the angle member and in a supported position on the horizontal leg 53 is a base member 54 of a pipe construction. Slidably mounted within the base member 54 is a support member 56 that is also of a pipe construction. As shown in FIG. 12 the base member 54 is of a length slightly greater than the length of the bumper 22 and the support member 56 is of a length so as to have end sections 57 and 58 projected from the base member 54 to positions extended laterally outwardly, respectively, from the vehicle front wheels, indicated at 59 and 61.

Slidably received on the right-hand end section 57 of the support member 56 is a tubular bearing member 62 (FIGS. 11 and 13) to the top side of which is secured, as by welding, a sleeve member 63, the axis of which extends normal to the axis of the bearing member 62. A shaft or rod 64 has one end 66 positioned between and welded to lugs 67 that are secured to the inner side 68 of the front track member 32. The opposite end of the shaft 64 is projected through the sleeve member 63. The bearing member 62 is held in an adjusted position relative to the support member 56 by friction screws 71 (FIGS. 11 and 12); the shaft 64 is secured to the sleeve member 63 by a friction screw 72; and the support member 56 is secured in an adjusted position relative to the base member 54 by friction screws 75.

The left-hand end section 58 of the support member 56 has welded across the end face thereof a transverse pipe member 73 (FIGS. 11 and 12). A brace member 74 for the front upright track member 32 is releasably clamped to the pipe member 73 by means including an upright plate member 76 that constitutes a bottom extension at the lower end of the brace member 74. A stud 77 secured to the plate 76 extends axially through the pipe member 73 for operative association with a ring and nut assembly 78. On tightening of the nut, in the assembly 78, the pipe member 73 is rigidly clamped between the plate 76 and the ring of the assembly 78.

As shown in FIG. 10 the upper end of the brace member 74 carries a cross pipe 81 which is coaxially alignable with a pipe 82 extended transversely of and secured to the inner side 68 of the front track member 32. A connecting pin 83 extended through the pipes 81 and 82 is retained against axial movement by cotter keys 84.

As thus far described, it is seen that the frame 21 on loosening of the friction screws 75 is adjustably movable transversely of the vehicle 24 from a first position adjacent the right side of the vehicle to a second position located laterally outwardly from the right side of the vehicle. For transport purposes the upper end sections 41 of the track members 32 and 33 are readily foldable inwardly toward each other to appreciably reduce the overall height of the scaffold structure. In one embodiment of the invention, the track members 32 and 33 are about 17 feet high and foldable to a transport height of about 12 feet. It is likewise apparent that the frame 21 is readily removed from the vehicle 24 by merely disconnecting the plates 76 at the lower ends of the brace members 74 from corresponding pipe members 73 and pulling the rods 64 out of engagement with their corresponding sleeve members 63.

The lateral adjustment of the frame 21 relative to the right side of the vehicle 24 provides for the location of the platform 28 adjacent a wall surface being worked on having plants, window wells or the like along its bottom side which preclude the vehicle 24 from being driven close to the wall. Since the carriage members 26 and 27 are of similar construction and similarly assembled with the platform 28 and corresponding track members 32 and 33, only the front carriage member 26 will be described in detail, and like numbers will be applied to like parts.

The carriage member 26 (FIGS. 1 and 2) is of a right-angle shape in side elevation and includes an upright section 86 and a horizontal section 87 projected from the top end of the upright section 86. As best appears in FIG. 3 the horizontal section 87 is of a square tubular construction and the upright section 86 (FIGS. 5, 6 and 7) is of a channel shape in transverse cross section. The carriage member 26 is supported for vertical movement along the track member 32 by the provision of a pair of roller units secured to and spaced longitudinally of the upright section 86. Each roller unit 88 includes a horizontal connecting member 89 secured to the web 91 of the upright section 86 and extended therefrom through the slot 36 into the track member 32. A vertically extended frame member 92 secured to the free end of the connecting member 89 carries a pair of rollers 93 at each end thereof. The rollers 93 in the upper one of the roller units 88 are ridable within the tracks 38 to each side of the center slot 34, while the rollers 93 in the lower roller unit 88 are in riding engagement with the inner wall 68 of the track member 32.

The platform 28 (FIGS. 2 and 4) includes a pair of inverted channel members 94 spaced transversely of the platform and secured in supported positions at opposite ends of the horizontal sections 87 of the carriage members 26 and 27. Longitudinally spaced transverse members 96 positioned between and interconnected with the channels 94 provide the support for a wooden panel or the like 97.

The platform 28 is movable to vertically adjusted positions relative to the track members 32 and 33 by means including the winch and motor assembly 29 which is carried on a mounting frame 98 secured in a depending relation from the channels 94. The motor 99 of the assembly 29 is of a reversible direct current type provided with a gear reduction unit 101 (FIG. 2) having an output or drive shaft 102. The winch 103 of the assembly 29 includes a two section drum 104 mounted on a shaft 106 rotatably supported in the frame 98. The shaft 106 is connected in a driven relation with the shaft 102 by a chain and gear assembly indicated generally at 107.

The end of an upper section 86 adjacent a corresponding track 32 and 33 has a pulley 108 supported for rotation about a horizontal axis 109 (FIGS. 2 and 3). The pulley 108 is positioned within the horizontal section with its inner side projected from the inner end of the horizontal section 87. The lower side of the pulley 108 is in substantial linear alignment with one side of a horizontal pulley 111 supported on the horizontal section 87 for rotation about a vertical axis 112 arranged to one side of the section 87. Thus as shown in FIG. 3, the pulley 111 extends partially within the horizontal section 87 through a slot 113 formed in the sidewall 114 thereof at a position substantially opposite one of the sections of the drum 104. A cable 115 wound about each drum section extends therefrom for travel about the horizontal pulley 111 (FIG. 9) and about the vertical pulley 108 and through the center slot 36 into an upright track member for securement or attachment of its free end to a pin 119 carried in the top end of a track member. In this arrangement of the cables 115 it is seen that the winding of the cables takes place from opposite sides of the driven shaft 106.

Thus, upon driving the motor 99 in one direction the platform 28 is moved upwardly, and by reversing the direction of the motor, the platform 28 is lowered. By virtue of the upright pulleys 108 being vertically spaced about the upper one of the roller units 88 that portion of a cable 115 located between a pulley 108 and the top end of a track member 32 and 33 is always extendible through a center slot 36 for location within the corresponding track member. Likewise it is seen that the remaining portion of a cable 115 from a pulley 108 to the drum 104 extends partially through a horizontal section 87 and then inwardly of the platform 28 along the underside thereof. As a result, the cables 115 are substantially concealed within the track members 32 and 33, horizontal sections 87 and the platform 28 so as to positively preclude being contacted by or becoming entangled with a workman on the platform. Likewise, the electric cable 116 for the motor 99 is suspended directly downwardly from the underside of the platform 28 for connection to a suitable source of power such as the battery (not shown) of the vehicle 24.

During the transport of the scaffold structure 20, the platform 28 is moved to a position below the truss assembly 43 prior to the inward folding of the upper sections 41 of the track members 32 and 33. The platform 28 is then foldable downwardly and through the frame 21 for location between the truss assembly 43 and the vehicle 24. This folding action is accomplished by having a horizontal section 87 formed of two sections that are hinged together at 117 (FIGS. 2 and 3). In their extended position the sections are held in alignment by connecting straps 118. It is to be noted that the folding of the frame 21 and platform 28 takes place without entanglement or hanging of the cables 115 so that on the unfolding of the frame 21 and the platform 28 the cables 115 are in operating positions for adjustably moving the platform.

I claim:
1. A scaffold structure comprising:
   a. a pair of vertical longitudinally spaced tubular track members each of which has an upright slot in one side thereof,
   b. means supporting said track members in a parallel relation including brace members interconnecting said track members with the one sides thereof in a common plane,
   c. carriage members corresponding to said track members, each carriage member including an upright section and a horizontal section,
   d. means supporting said upright sections on corresponding track members for movement of said carriage members to vertically adjusted positions,
   e. a horizontal work platform, f. means securing the work platform in a supported position on said horizontal sections,
g. a motor and winch assembly supported from the underside of the platform including a winding drum,
h. a first pulley mounted on each carriage member adjacent the upper end of an upright section for rotational movement in a vertical plane extended through the slot of a corresponding track member,
i. a second pulley mounted on each horizontal section at a position spaced outwardly from a first pulley for rotational movement above a vertical axis,
j. a pair of cables corresponding to said pair of carriage members, each cable wound on said winding drum and extended therefrom about said second and first pulleys for securement to the upper end of a corresponding track member, and
k. means for connecting said motor to a source of power supply.

2. The scaffold according to claim 1 including:
a. upper and lower pairs of rollers on the vertical section of each carriage member located within a corresponding track member, the lower pair of rollers ridable on the inner surface of the side of a track member opposite the one side thereof, and the upper pair of rollers ridable on the inner surface of the one side of a track member, with the slot in said one side positioned between each of said pairs of rollers,
b. said first pulleys spaced above said upper pair of rollers whereby, on up and down movement of said platform, the portion of each cable between the upper end of a track member and a corresponding first pulley is receivable within a track member through the slot therein.

3. A scaffold for mounting on a road vehicle having front and rear bumpers and a source of electrical power comprising:
a. front and rear support members extended transversely of the vehicle and corresponding to said front and rear bumpers, respectively,
b. means for mounting a support member on a corresponding bumper for adjustable movement longitudinally thereof,
c. a pair of upright track members at one side of and spaced longitudinally of the vehicle corresponding to said support members,
d. means securing a track member to each of said support members adjacent corresponding one ends thereof,
e. means interconnecting said track members,
f. brace means extended between and connected to each track member and a corresponding opposite end of a support member,
g. a pair of carriage members corresponding to said track members, each carriage member including an upright section and a horizontal section projected outwardly from said one side of the vehicle.
h. means movable supporting each of said upright sections on a track member for adjustable up and down movement of said carriage members,
i. a horizontal platform carried on and secured to said horizontal sections,
j. a reversible motor and winch assembly mounted on said platform in a position to the underside thereof,
k. cable means interconnecting said winch with each of said carriage members, and
l. means connecting said motor to said source of electrical power.

4. The scaffold for mounting on a road vehicle according to claim 3 wherein:
a. each support member is of a circular tubular construction,
b. said mounting means includes a circular tubular base member through which a support member is slidably adjustably extended,
c. means rigidly securing a base member on a corresponding bumper, and
d. means for locking a support member in an adjusted position relative to a corresponding base member.